Nov. 30, 1948.　　　　K. V. HART　　　　2,455,057
ELECTRIC WELDING APPARATUS
Filed Nov. 7, 1946　　　　4 Sheets-Sheet 1
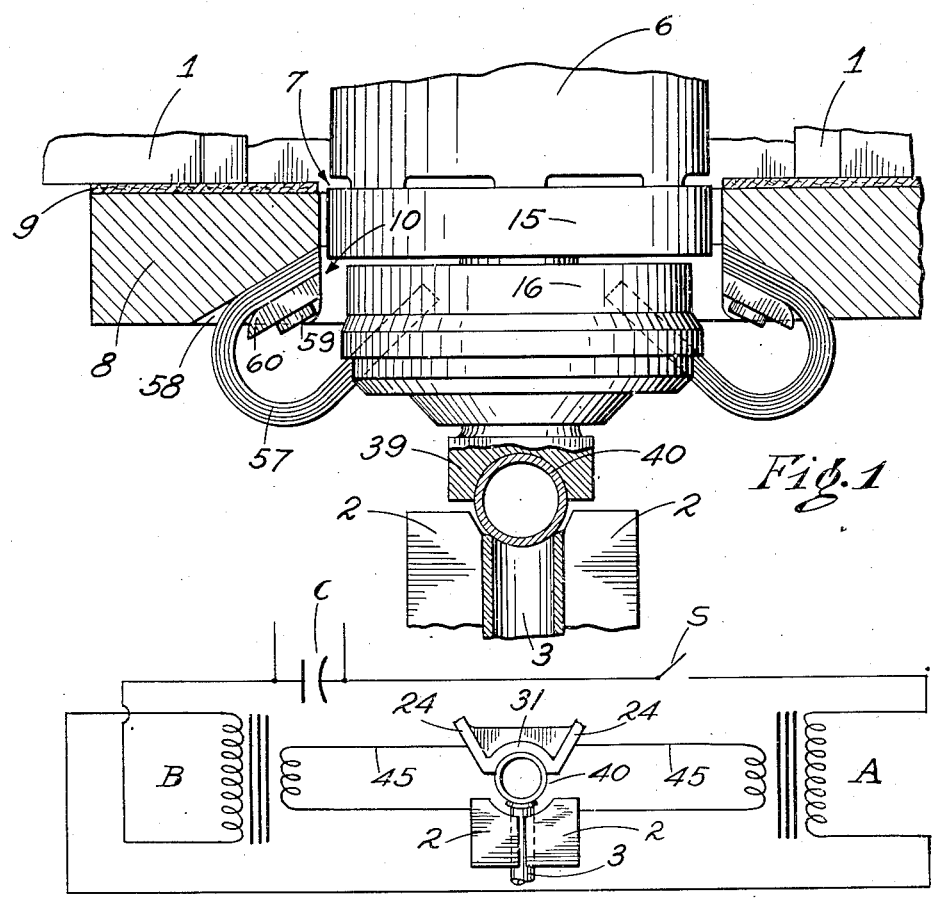
Fig. 1
Fig. 7
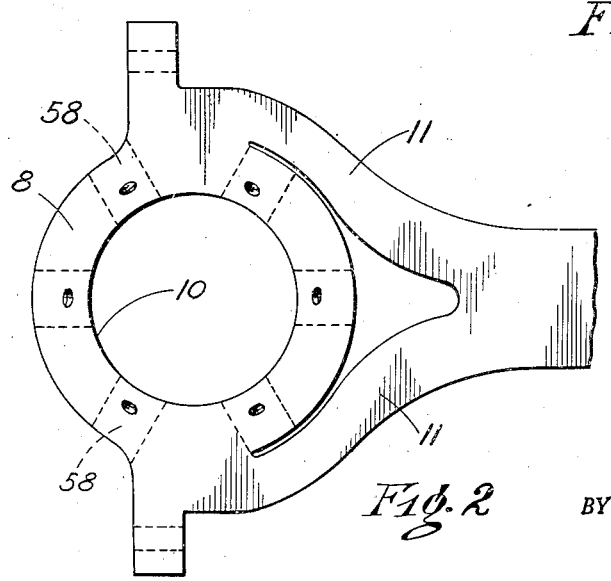
Fig. 2
INVENTOR.
KENNETH V. HART
BY
Richey Watts
ATTORNEYS Nov. 30, 1948.    K. V. HART    2,455,057
ELECTRIC WELDING APPARATUS
Filed Nov. 7, 1946    4 Sheets-Sheet 2
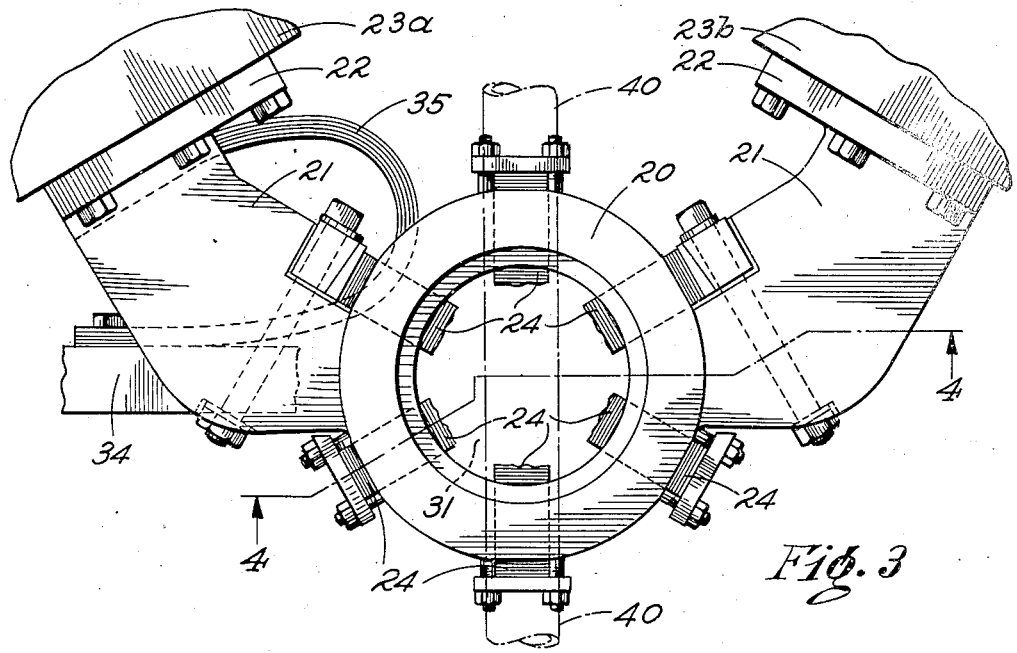
Fig. 3
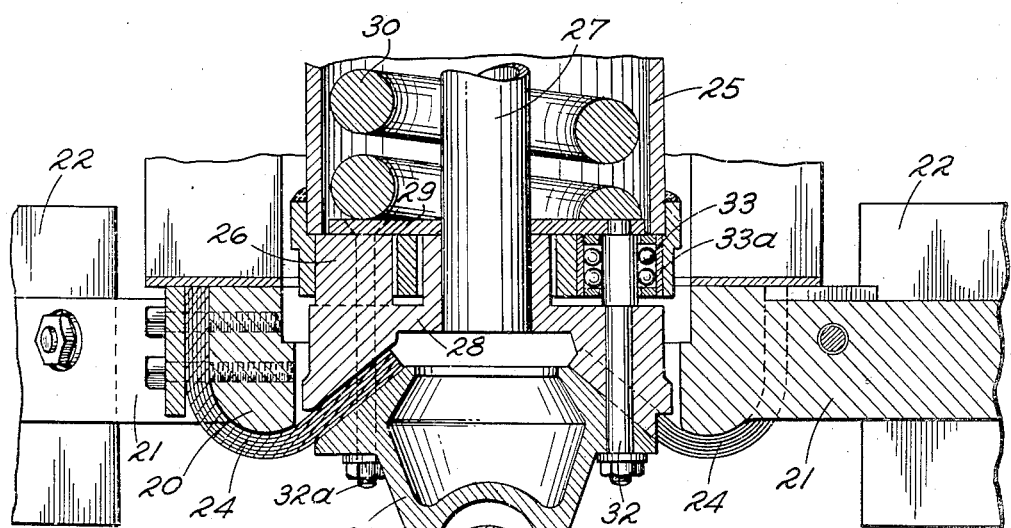
Fig. 4
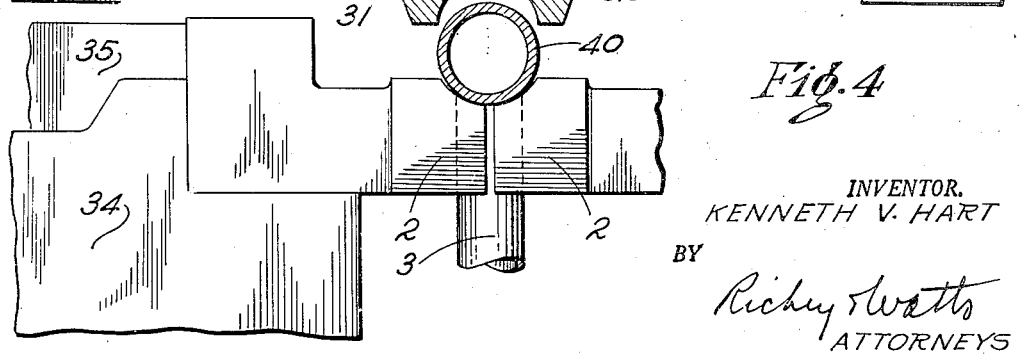
INVENTOR.
KENNETH V. HART
BY
Richey & Watts
ATTORNEYS

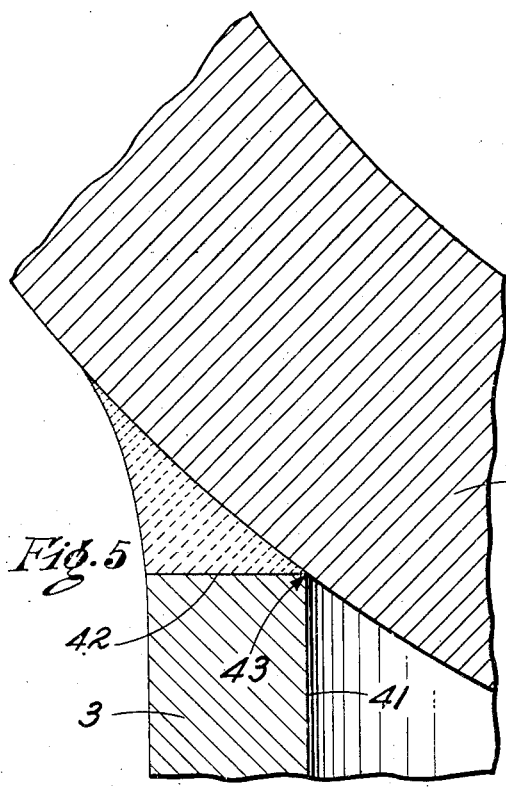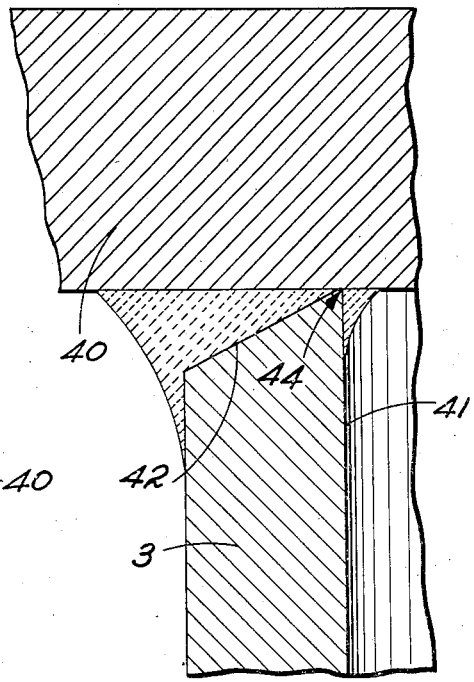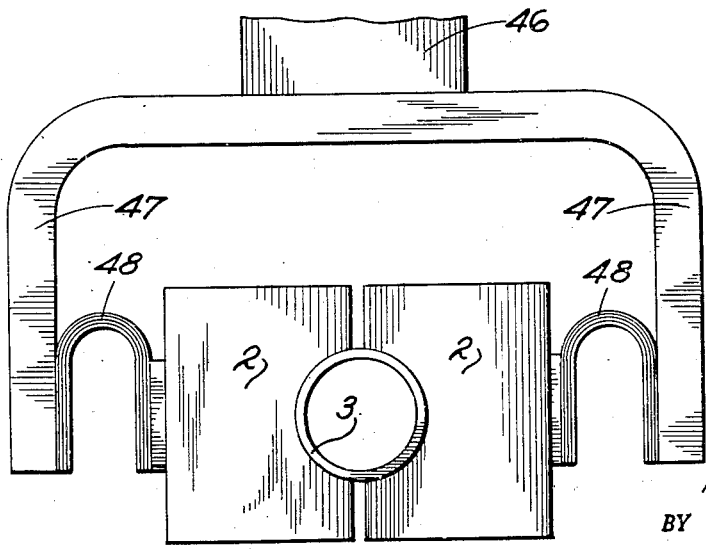

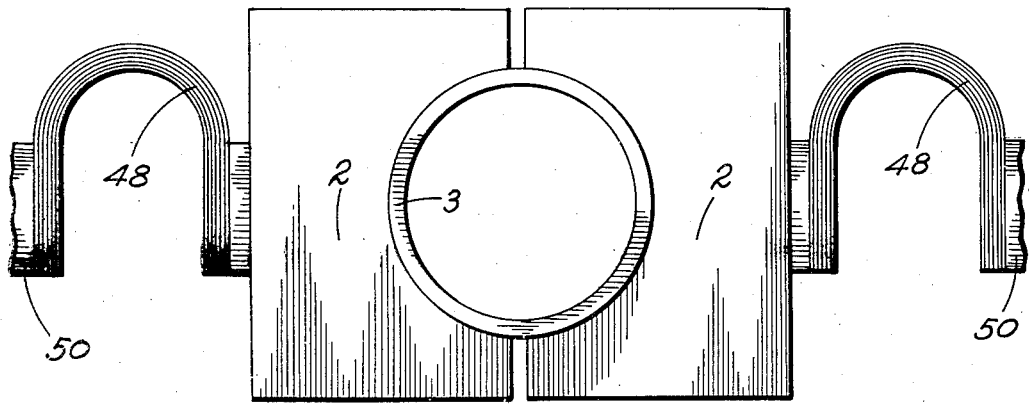
Fig. 9
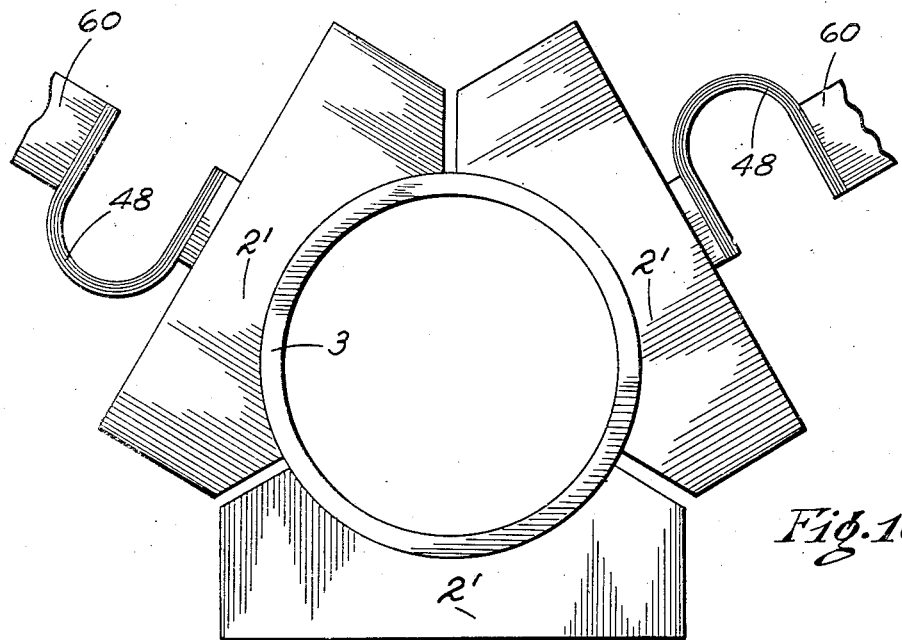
Fig. 10
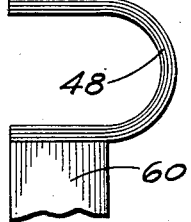

Patented Nov. 30, 1948

2,455,057

UNITED STATES PATENT OFFICE 2,455,057

ELECTRIC WELDING APPARATUS

Kenneth V. Hart, Cleveland, Ohio

Application November 7, 1946, Serial No. 708,276

12 Claims. (Cl. 219—4)

1

This invention relates generally to the art of electric welding and particularly to a new method of, and apparatus for, welding the end of a tubular ferrous metal article to the side surface of another metal article.

The present application is a continuation-in-part of my copending application Ser. No. 568,259, filed December 15, 1944, now Patent No. 2,417,075, dated March 11, 1947. In that application I disclosed improved apparatus for making the resistance surface welds of my Patent No. 2,183,563 and for carrying out the methods of my Patent No. 2,091,982 and of my application No. 568,258 filed December 15, 1944, now Patent No. 2,425,470, dated August 12, 1947.

The novel weld or welded joint of those patents and applications involves the use of a wedge-shaped space and a narrow, continuous line contact between the surface at the end of a tubular article and the surface of an opposed article, the exceptionally rapid heating of the metal back of the line contact, the simultaneous application of welding pressure and the almost simultaneous application of "follow-up" pressure.

The end of the tubular article was beveled to provide the line contact and wedge-shaped space. When the line contact was to be at the inner edge of the article, the end surface was inclined to that surface at such an angle as would define with the opposed surface a wedge-shaped space of the size desired. This angle varied depending on the metal of the articles, the depth of penetration of the weld, the size of the fillet, and the shape of the opposed surface, that is, whether it was flat or contoured, as is shown in the drawings of Patent No. 2,417,075. For example, when the opposed article is a flat steel plate, a steel tube to be welded thereto should make an included angle with the inner surface of the tube which ranges between about 83° and about 45°, with about 65° being preferred. When the opposed surface is the side of a steel tube, the end surface of a steel tube to be welded thereto should make an included angle with the inner surface thereof which ranges between 45° and about 120°, with between about 65° and 90° being preferred at various places around the end of the article.

Certain difficulties were encountered in making the novel welds. A considerable amount of care was required to form the end surfaces with the precision necessary to make a continuous line contact, particularly when the end surface was to fit against an opposed contoured surface. When the angularity of the end surface of the tubular article to the inner surface of that ar-

2 ticle, that is, the size of the included angle back of the line contact, varied widely as when the tubular member was opposed to the side of another tubular member, the rate of heating of the metal in the included angle back of the line contact varied considerably with the metal in the larger included angle heating more slowly than the metal in a small included angle. Since, the heating was to take place with extreme rapidity, it was important that the heating of the metal in the included angle back of the line contact should be substantially uniform, for otherwise some of the metal might be overheated and lost by being blown away before other parts of the metal had attained a welding temperature. These difficulties were most pronounced in the welding of the end of a tubular article against the side of another tubular article. Under certain conditions it was difficult to make the novel welds with a uniform width of strong, dense structure therein even when the machining of the end surface of one article was quite accurate and the welding current was distributed to the pressing die at a plurality of spaced places. This difficulty was traceable in part to the wide variation in the amount of metal back of the line contact at various places around the ends of a tubular article. Furthermore, a high degree of accuracy in machining could not be depended upon in large scale commercial production and the ordinary manufacturing tolerances frequently exaggerated the difficulties traceable to variation in amount of metal to be heated.

These various conflicting factors have been reconciled and overcome by the present invention. According to this invention the end surface of a tubular article need not be machined with extreme accuracy and the variations in the amounts of metal back of the line contact may vary widelly, for example, as measured by included angles ranging from about 65° to about 130°. Strong, sound, non-porous resistance surface welds may be made under these conditions consistently and with great rapidity.

According to this invention separate currents are caused to flow simultaneously thru different parts of the line contact, and these currents are so applied as to make more or less uniform the heating of the metal in angles of various sizes along the line contact. Means is provided by which two or more sources of electrical power may be used in making a single joint, means is provided for increasing the speed of application of "follow-up" pressure, and means is provided for minimizing reactance losses in the secondary circuit. By these means the time required for welding is decreased and the quality of the joint is improved.

The present invention will be better understood by those skilled in the art from the drawings accompanying and forming a part of this specification, in which Fig. 1 is a fragmentary, partly sectional view showing welding apparatus of Patent No. 2,417,075 with which apparatus embodying the present invention may be associated.

Fig. 2 is a top plan view of the ring conductor of Fig. 1, showing the means for connecting a transformer thereto.

Fig. 3 is a top plan view, partly in section, showing an improved ring conductor for attachment to two transformers.

Fig. 4 is a cross-sectional view, taken on line 4—4 of Fig. 3 and showing parts of an improved pressure inner slide assembly.

Figs. 5 and 6 are enlarged, fragmentary, cross-sectional views taken on different planes thru an assembly of a tube end and tube side before and after welding.

Fig. 7 is a wiring diagram showing the arrangement of two transformers and apparatus embodying the present invention.

Figs. 8, 9 and 10 are fragmentary plan views showing, respectively, the connection of one, two and three transformer secondaries to the clamping die of Fig. 1 or 4.

The apparatus shown in Figs. 1 and 2 comprises a frame 1 supporting a fixed die or clamping means 2 consisting of two or more similar parts and in which one of the articles to be welded, for example, tube 3, may be supported and held during the welding operation. The frame also includes a reciprocable pressure device or head 6 which may move axially in an opening 7 in frame 1. A current conductor 8 is secured to the frame and is insulated therefrom as by insulation 9. Conductor 8 (see Fig. 2) is preferably a thick copper plate having an opening 10 aligned with opening 7 and having arms extending from diametrically opposite places along the sides of body 6 to an end flange (not shown) which may be secured to one terminal of a transformer secondary (not shown). It will be understood that the other terminal of the transformer secondary is suitably connected to the fixed die or clamping means 2. The space between conductor 8 and arms 11 may be filled with insulation, the better to distribute current equally to the circular portion of the conductor.

If, and when, it is desired to use two or three transformers the arms 11 and the flange at the end thereof may be replaced by a plurality of conductors, each of which is clamped to plate 8 and to a transformer. The current will be distributed uniformly to the movable die when two transformer secondaries are connected to plate 8 by conductors which are 180° apart, that is, at diametrically opposite places as noted in Fig. 3, or when three transformers are connected to plate 8 by conductors which are 120° apart.

The reciprocable pressure device or head 6 comprises endwise movable outer and inner slides 15 and 16. The outer slide may be attached to the crankpin of a rotatable crankshaft (not shown) for endwise movement. The inner slide 16 bears against a compressed spring within the outer slide and moves with the outer slide under certain conditions and relative to it under other conditions. The inner slide carries a die 39 which is shaped to receive and press against tube 40 to be welded to tube 3. This die has a tapered shank which fits closely in a corresponding aperture in the inner slide. When the outer slide is actuated endwise toward clamping die 2 the inner slide and die 39 move with the outer slide until such movement is resisted by engagement of tube 40 on the end of tube 3 which is gripped by clamping die 2. The resistance offered by tube 3 to continued movement of die 39 is absorbed by compression of the spring between the inner and outer slides with consequent relative movement of the outer slide relative to the inner slide. When as a result of the flow of welding current thru the area of contact between tubes 3 and 40 this contact area softens or comes to a state of incipient fusion, the resistance to axial movement of die 39 toward tube 3 is lessened and thereupon the coil spring expands and urges die 39 and tube 40 toward tube 3 in what has been described in my application Ser. No. 568,259 as a "follow-up" action.

The inner slide head 16 is connected to conductor 8 by a plurality of laminations 57 which are generally U-shaped. Their outer ends are held in recesses 58 in conductor plate 8 as by cap screws 59 extending thru the laminations and threaded into plate 8 and pressing clamps 60 against the outer surfaces of the laminations. These laminations are preferably composed of several copper bands of considerable width and slight thickness and each band is preferably silverplated. The several groups of laminations should be capable of such current carrying capacity that four of the six groups shown can conduct the welding current without undue heating.

Figs. 3 and 4 show a modified ring conductor and pressure head assembly. Ring conductor 20 has opposite arms 21 leading to terminals 22 which may be attached to secondary terminals 23a and 23b of two different transformers. Laminations assembled in groups 24 are connected against the outer side of ring 20 at substantially equally spaced places and extend around the curved outer lower edge of the ring and across its bottom and at their inner ends are connected to the pressure head. The ring 20 may be recessed to receive laminations 24 and the recesses may be as deep as the thickness of the laminations so that the latter will be surrounded on three sides by the ring.

The pressure head comprises an outer slide and an inner slide. The outer slide includes an outer tube 25 and a guide ring 26 attached thereto. Tube 25 is attached to apparatus (not shown) for causing endwise movement thereof after the manner described above in connection with Fig. 1. The inner slide includes an inner tube 26 whose upper end slides in bearing (not shown) in the outer head and whose lower end extends thru ring 26 and is secured in saucer-shaped inner head or die holder 28. A disk 29 is pressed against the upper end of holder 28 by coil spring 30 which is disposed in the outer slide and around tube 27. Pressure die 31 is hollow, is suitably shaped to receive tube 40 which is to be welded to tube 3, and is secured in inner head 28, as by bolts 32 and 32a. The bolts 32 serve not only to clamp laminations 24 between the die and the inner head but also to guide the inner slide in its axial movement relative to the outer slide. This guiding action results from the illustrated construction in which the upper ends of bolts 32 are guided by ball bearings 33 which are positioned in hardened bushings 33a pressed in pockets in ring 26. The upper ends of bolts 32 project into holes in disk 29. Bolts 32a serve not only to clamp laminations 24 between the die and the inner head but also to locate and press disc 29 against the upper end of the head.

Clamping die 2 consists of two similar parts, each being similarly supported and connected to the transformers, only one of these supports and connections being shown. Each lower die 2 is attached to an electrically conductive slide 34 which is mounted for sliding movement on the front of the base of the machine (not shown) so that the die may be moved toward and away from tube 3. Slide 34 is connected to laminations 35 which may in turn be connected to a terminal similar to terminal 22. These laminations are preferably composed of copper or copper alloy and are covered with silver.

It will be understood that one terminal of a transformer secondary may be connected to terminal 22 and the other terminal of the transformer may be connected to a corresponding terminal (not shown) to which laminations 35 are attached. In such case, the tubes 3 and 40 are included in the secondary circuit of the transformer which also includes arm 21, ring 20, laminations 24, die 31, die 2, slides 34, and laminations 35. There may be as many of these separate secondary circuits as there are arms 21 and clamping die parts 2. Also, as will presently appear, the secondary circuit of one transformer may be split so as to provide two or more separate circuits, each including tubes 3 and 40.

In the apparatus of Figs. 3 and 4 the two groups of laminations adjacent to each of arms 21 carry most of the current between the ring 20 and the pressure die 31 and the laminations remote from the arms normally carry little or no current but may carry current which is in excess of the carrying capacity of the other laminations. The laminations 24 are preferably made light and thin so as not to interfere with the quick "follow-up" action of the inner slide and the small size of the laminations may limit the current carrying capacity of the laminations so that some of the welding current will flow thru the remote laminations. Thus most of the current flows thru the line contact between articles to be welded where the included angle is greatest, as angle 43 in Fig. 5, and less current flows directly from ring 20 to the line contact where the included angle is smallest, as angle 44 of Fig. 6; and as a result the larger amounts of metal are heated at about the same rate as the smaller amounts of metal.

It will be seen, from consideration of Fig. 4, that each of the secondary circuits there shown has sides which are parallel and as close as possible to each other. This parallelism and adjacency results in increased electrical efficiency.

It will be noted that the apparatus shown in Figs. 3 and 4 differs in several respects from the apparatus shown in Fig. 1 hereof and in my Patent No. 2,417,075. The top disc 31, that is, the inner slide, is considerably lighter than the corresponding apparatus of the said application. A single, lightweight, hollow die 31 has replaced two parts, viz: the upper die 39 with its shank and the die holder 43. This die is preferably composed of relatively hard, good conductor metal such as Mallory copper alloy. The inner slide is guided by ball bearings which insures close tolerance on side motion and minimum friction on up and down motion.

The effect of positioning the laminations 24 on the outer side and across one end of ring 20, within which they are connected to the inner slide, is manifested in the "kick" which occurs when current is flowing thru these parts. The flow of current thru the conductors has two effects on the laminations. Since the electrical force exerted by the side of the circuit, including slide 34 and laminations 35, against the other side including ring 20 and laminations 24 varies with variations in the intervening distance, much of that force is absorbed by ring 20. As a result, laminations 24 may be moved toward slide 34 by overcoming less force than if ring 20 were farther away from slide 34. The other effect is that the current tends to cause laminations 24 to straighten out and such movement takes place when that low resistance is overcome with resultant movement of the inner slide and pressing die toward the clamping die. Since this movement takes place when the current flows thru the laminations, it creates the desired "follow-up" pressure on the weld at the time when it is most effective.

Figs. 5 and 6 show variations in the bevel on the end of tube 3 at different points on its circumference when that tube is to be welded to the side of a cross tube 40. In Fig. 5 the initial contact between tubes 3 and 40 is a line which is the intersection of inner surface 41 and end or beveled surface 42 of tube 3. These surfaces include a substantially right angle 43 in a plane extending transversely of the cross tube. In some instances this angle may be as much as 130° depending in part on the relative diameters of the tubes. In Fig. 6, which is taken at 90° to Fig. 5, the surfaces 41 and 42 include an acute angle of about 65°. The included angles between the places shown in Figs. 5 and 6 vary between the angles there shown.

Angles 43 and 44 include quite different amounts of metal and different amounts of current are required to heat the metal at the apices of these angles to welding temperature. Since the flow of current per unit of contact area and the resultant heating decrease as the area of contact increases, it follows that the heating effect will increase at a faster rate at the smaller included angle 44 than at the larger angle 43. As a result, there may be overheating or blowing out of the metal at places, such as at angle 44, and underheating or poor welding, or no welding, at other places such as at angle 43. By means of the present invention I am able to prevent such a variation of current and heating and to maintain a substantially uniform flow of current and heating between the end surface of a tube and the side surface of another member despite variations in the sizes of included angles.

Fig. 7 shows diagrammatically part of the apparatus of Fig. 4 and wiring connecting it to two transformers. In this figure the tube 3 is secured in clamping die 2 while the cross tube 40 is pressed against the end of tube 3 by pressing die 31 which is connected thru laminations 24 to a ring conductor 20 (not shown in this figure). The energized primary circuits of transformers A and B are connected in series thru switch S and may include a condenser C. Each secondary circuit of transformers A and B include laminations 24, die 31 and a part of clamping die 2. Thus the primaries are connected in series and the secondaries in parallel and the current flows simultaneously in the secondaries.

In Fig. 8 tube 3 is shown as being gripped in the two-part clamping die 2 of Fig. 1. One terminal of the secondary winding of a transformer (not shown) may be connected to ring conductor 8. The other terminal of the secondary is formed in two branches 47 and the branches are connected thru laminations 48, similar to laminations 57, to the parts of die 2. The apparatus of Fig. 4 may be connected similarly to one transformer.

In Fig. 9 one secondary terminal 50 of one transformer A of Fig. 7 is connected to one part of die 2 and a similar terminal 50 of the secondary of another transformer B is connected to the other part of die 2. These connections may be made thru U-shaped laminations 48 and are spaced 180° apart about tube 3. The other terminals of the secondaries may be electrically connected to the pressing die 39 thru ring 8 or to die 31 thru ring 29.

In Fig. 10 the tube 3 is shown as being clamped in a die consisting of three equal parts 2'. These three parts are connected thru U-shaped laminations 48 respectively to the secondary winding of three separate transformers. In this case terminals of the secondaries of the three transformers are connected thru the die parts 2' to tube 3 at places which are 120° apart. The other secondary terminals may be electrically connected to ring 3 or ring 29 at spaced places, preferably 120° apart.

When one terminal of the secondary winding of a single transformer is connected to a clamping die at only one place, there will be flow of current thru the entire line of contact but it will be greatest close to the connection to the transformer and resultant heating which takes place all around tube 3 may vary in intensity. Even assuming that a condition of reasonable uniformity of current flow exists initially, it may not persist after variations occur in the width of the area of contact between tube 3 and the opposed article and resultant variation in heating may take place as a result thereof.

When the terminal of a single transformer is connected to the clamping die at opposite places, as is shown in Fig. 8, or the secondary terminals of two or three transformers are connected at spaced places, as is shown in Figs. 9 and 10, a more uniform weld is formed around the tubular shaped end and the possibility of the formation of defective welds is considerably decreased even tho substantial variations in areas of contact may occur during the welding operation. It is obvious that when the current flows thru a circumferential length of 180° or 120° there is much less opportunity for variation in distribution of welding current flowing thru a given length of contact area than where the current must flow thru a circumference of 360°.

In all cases, including the arrangements shown in Figs. 8, 9 and 10, the other terminal of each secondary winding is connected to the ring conductor ring at spaced places and the ring is connected by laminations to the pressing die.

Since it is highly desirable, when using two or more transformers, that these transformers should discharge their welding current impulses simultaneously, the primary windings of these transformers are connected in series, as is illustrated in Fig. 7, and the secondaries are connected in parallel, as has just been described. When the minus terminals of the secondary windings are electrically connected to pressing die 39 or 31 and the positive terminals of the secondaries are connected to the clamping dies, or vice versa, the electrical field of each transformer is largely concentrated in the part of the clamping die which is connected thereto. In this manner the current from each transformer is concentrated in its clamping die part and is distributed more or less equally thruout the adjacent part of the tube in the die.

The present invention may be used to weld articles composed of different metals and alloys which are capable of being electric resistance welded including iron, steel, stainless steel, copper alloys and aluminum alloys.

Having thus described my invention so that others skilled in the art may be able to understand and practice the same, I state that what I desire to secure by Letters Patent is defined in what is claimed.

What is claimed is:

1. Welding apparatus comprising an article pressing die, a multipart tube clamping die and transformer secondary means connected in parallel to said pressing die at a plurality of spaced places and to each of the parts of the said clamping die.

2. Welding apparatus comprising an article pressing die, a ring conductor electrically connected to said pressing die at a plurality of places spaced thereabout, a multipart tube clamping die and a transformer including a secondary winding having one terminal connected to said conductor and another terminal connected to each of the parts of said clamping die.

3. Welding apparatus comprising an article pressing die, a ring conductor electrically connected to said pressing die at a plurality of spaced places, a tube clamping die and a plurality of transformers including primary windings and secondary windings, the primary windings being connected in series, and the secondary windings being connected in parallel to said conductor and to said clamping die.

4. Welding apparatus comprising an article pressing die, a conductor electrically connected to said pressing die, a tube clamping die and a plurality of transformers having their primaries connected in series and their secondaries connected in parallel to said conductor and to said clamping die.

5. A welding apparatus comprising a ring conductor having a rounded end edge and outwardly extending arms spaced apart equally for connecting said conductor to transformer secondary means, and laminated conductors secured against the outer surface and extending radially past said rounded end edge of the conductor.

6. A pressure head for an electric welder comprising an outer slide including an outer tube and a guide ring at one end thereof, a light weight inner slide including an inner tube extending thru said guide ring, a die holder on said inner tube and projecting into said guide ring, a hollow die seated on said holder and means securing said die and holder in assembled position.

7. A pressure head for an electric welder comprising an outer slide including an outer tube and a guide ring at one end thereof, an inner slide including an inner tube extending thru said guide ring, a die holder on said inner tube and projecting into said ring, a hollow die, and means including bolts extending thru said die and holder and pressing them against each other.

8. A pressure head for an electric welder comprising an outer slide including an outer tube and a guide ring at one end thereof, an inner slide including an inner tube extending thru said guide ring, a die holder on said inner tube and projecting into said guide ring, a hollow die, bolts extending thru said die and holder for securing them in assembled position and projecting into said guide ring, and ball bearings in said guide ring and surrounding certain of said bolts for guiding the bolts when they move axially.

9. Electric welding apparatus comprising outer and inner relatively movable slides, said inner slide including a saucer shaped holder and a hollow die seated therein, a ring conductor surrounding said holder and having a rounded edge surface, laminated conductors secured against the outer surface of said ring, normally bearing against said rounded surface, and projecting between said holder and die, and means for clamping said holder and die together and against said laminations, said clamping means projecting into said outer slide, and bearings carried by said outer slide for guiding relative movement of said clamping means.

10. Electric welding apparatus comprising outer and inner relatively movable slides, said inner slide including a holder and a die, a ring conductor surrounding said holder and having a rounded edge, laminated conductors secured against the outer surface of said ring and projecting across said rounded edge and between said holder and die, and means for clamping said holder and die together and against said laminations.

11. Electric welding apparatus comprising outer and inner relatively movable slides, said inner slide including a holder and a hollow die, a ring conductor surrounding said holder and having a rounded edge surface, laminated conductors secured against the outer surface of said ring and projecting across said edge surface and between said head and die, and means for securing said laminations, holder and die in assembled position, said securing means projecting into said outer slide, means in said outer slide for guiding said securing means during movement relative to said outer slide, and a spring pressed disc in said outer slide and connected to said securing means.

12. Electric welding apparatus comprising a ring conductor defining an opening therethru and having arms projecting therefrom at substantially equally spaced places, a pressing die movable in said opening, laminated conductors secured against the outer surface of said ring and extending across one end of said ring and connected to said die, a clamping die comprising a plurality of similar parts movable toward and away from each other, and laminated conductors connected to each of said clamping die parts and disposed parallel and adjacent to said arms, means for connecting each of said arms to a transformer secondary winding and means for connecting each of the laminated conductors of the clamping dies to a transformer secondary winding.

KENNETH V. HART.

REFERENCES CITED

The following references are of record in the file of this patent:

UNITED STATES PATENTS

| Number | Name | Date |
|---|---|---|
| 923,128 | Lachman | May 25, 1909 |
| 1,270,786 | Clapper | July 2, 1918 |
| 2,313,067 | Heath | Mar. 9, 1943 |